US007149900B2

(12) United States Patent
Rothrock

(10) Patent No.: US 7,149,900 B2
(45) Date of Patent: Dec. 12, 2006

(54) METHOD OF DEFENDING SOFTWARE FROM DEBUGGER ATTACKS

(75) Inventor: Lewis V. Rothrock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 10/319,736

(22) Filed: Dec. 12, 2002

(65) Prior Publication Data

US 2004/0117620 A1 Jun. 17, 2004

(51) Int. Cl.
*G06F 11/30* (2006.01)
*G06F 12/14* (2006.01)
*G06F 9/44* (2006.01)
*H04L 9/32* (2006.01)

(52) U.S. Cl. ............ 713/189; 713/187; 713/194; 717/124; 717/129; 726/22; 726/26

(58) Field of Classification Search ............ None
See application file for complete search history.

(56) References Cited

U.S. PATENT DOCUMENTS

| | | | |
|---|---|---|---|
| 5,892,899 A | 4/1999 | Aucsmith et al. | |
| 5,892,900 A * | 4/1999 | Ginter et al. | 726/26 |
| 6,105,137 A | 8/2000 | Graunke et al. | |
| 6,178,509 B1 | 1/2001 | Nardone et al. | |
| 6,205,550 B1 | 3/2001 | Nardone et al. | |
| 6,330,670 B1 * | 12/2001 | England et al. | 713/2 |
| 6,795,845 B1 * | 9/2004 | Kalafatis et al. | 718/108 |
| 2002/0042884 A1 * | 4/2002 | Wu et al. | 713/201 |
| 2002/0049909 A1 | 4/2002 | Jackson et al. | |
| 2002/0166085 A1 | 11/2002 | Peikari | |

FOREIGN PATENT DOCUMENTS

WO WO 99/01815 1/1999

OTHER PUBLICATIONS

S. I Hyder, et al., "A Unified Model for Concurrent Debugging," International Conference on Parallel Processing, 1993, pp. II-58-II-67, USA.
Peter A. Buhr, et al., "KDB: A Multi-Threaded Debugger for Multi-Threaded Applications," SPDT '96, pp. 80-87, Philadelphia, Pa, USA.
Michael B. Jones, et al., "CPU Reservations and Time Constraints: Efficient, Predictable Scheduling of Independent Activities," SOSP-16, Oct. 1997, pp. 198-211 Saint-Malo, France.
Partha Pal, et al., "Survival by Defense-Enabling," NSPW'01, Sep. 10-13th, 2002 pp. 71-78, Cloudcroft, New Mexico, USA.

* cited by examiner

*Primary Examiner*—Gilberto Barrón, Jr.
*Assistant Examiner*—Virgil Herring
(74) *Attorney, Agent, or Firm*—Steven P. Skabrat

(57) ABSTRACT

Deterring an attack on a tamper-resistant application program may be accomplished by loading a plurality of agents and starting a plurality of processing threads, each thread executing one of the agents, concurrently executing each agent substantially in parallel to produce a processing result for each agent for an iteration of a stage of protocol processing, storing each processing result in an entry in a buffer associated with each agent, and repeating the executing and storing actions for multiple iterations of the protocol processing. When one of the agents stores a processing result in a last entry of the agent's buffer, the processing results from the first entries in the buffers are combined to produce a combined result, and if the combined result indicates an error, failure semantics may be executed.

16 Claims, 3 Drawing Sheets

METHOD OF DEFENDING SOFTWARE FROM DEBUGGER ATTACKS

BACKGROUND

1. Field

The present invention relates generally to content protection and digital rights management and, more specifically, to deterring debugger attacks on software.

2. Description

The personal computer (PC) platform is an open and accessible computer architecture. However, the openness of the PC means that it is a fundamentally insecure computing platform. Both the hardware and software can be accessed for observation and modification. This openness allows malicious users and programs to observe and to modify executing code, perhaps with the aid of software tools such as debuggers and system diagnostic tools. Despite these risks, there are classes of operations that must be performed securely on the fundamentally insecure PC platform. These are applications where the basic integrity of the operation must be assumed, or at least verified, to be reliable. Examples of such operations include financial transactions and other electronic commerce, unattended access authorization, and digital content management.

For content providers, countering the threat of digital piracy on the PC requires new software that is resistant to attacks by a malicious user. In this scenario, the malicious user may wish to tamper with or replace particular components of the software in order to gain unauthorized access to digital content or to make unauthorized reproductions. A cryptosystem based on cryptographic methods employed in conjunction with the software may be used to help protect the content owner's rights. Content may be encrypted to provide some measure of protection, but the software creating and accessing cryptographic keys and the software accessing the decrypted content during playback are still vulnerable to attack.

Attackers may attempt to use debuggers to "single step" the software accessing valued content. In some instances, the debugger may set a breakpoint in the software to stop execution at the selected breakpoint. The debugger may then be used to examine data being operated on by the software. The debugger may also cause the execution of successive individual instructions, thereby allowing continued examination of program data. Although some techniques are known for deterring such activity, additional methods are desired in order to further improve the security of the system.

BRIEF DESCRIPTION OF THE DRAWINGS

The features and advantages of the present invention will become apparent from the following detailed description of the present invention in which.

DETAILED DESCRIPTION

Figure 1:
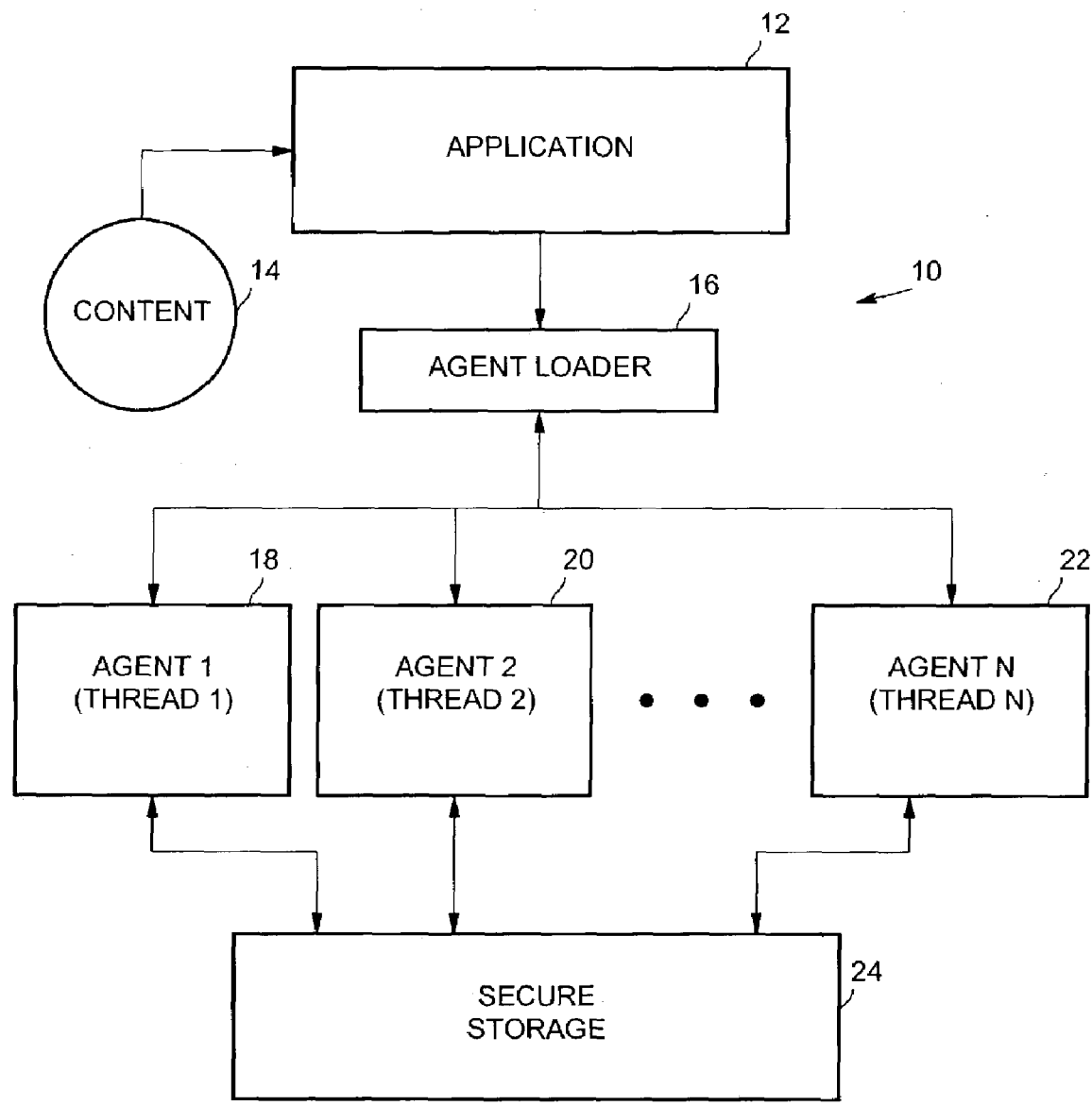
FIG. 1 is a block diagram of an architecture for defending software from debugger attacks by using multiple threads according to an embodiment of the present invention.

An embodiment of the present invention is a method of defending software from debugger attacks by using multiple threads. In at least one embodiment of the present invention, multiple integrity verification agents may be executed, each in its own thread, such that integrity checking of software components by the agents is distributed across the multiple threads. With this system, if an attacker uses a debugger to halt any one of the threads longer than a predefined period of time, this interruption of processing may be detected and further processing of content by the software components may be terminated.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are based on at least several observations. First, there are cryptographic techniques and protocols well suited for content protection that may be implemented using parallel algorithms. Second, operating systems schedule threads relatively fairly. Threads designed to be computationally equivalent should be able to accomplish substantially the same amount of work in substantially the same amount of time if the threads are not blocked. Third, many commercially available debuggers have one of two common weaknesses. When "single stepping" a single thread, either all other threads are halted, or all other threads are executed at full speed until a thread encounters a breakpoint, or becomes blocked. An example of the first instance of all other threads being halted is exhibited by the well-known Microsoft Windows system debugger called Softice, and application debuggers on UNIX, which must use the /proc and ptrace debug primitives. These synchronous primitives preclude independent and asynchronous control of individual threads within a UNIX process and restrict the debugger to independent control of one thread per UNIX process. See "KDB: A Multi-threaded Debugger for Multi-threaded Applications," Peter A. Buhr, et al., Section 4, "Asynchronous Control," Proceedings of the SIGMETRICS Symposium on Parallel and Distributed Tools, January 1996. An example of the second instance, that of all other threads executing at full speed until encountering a breakpoint or being blocked, is exhibited by many Microsoft Windows application debuggers.

In either instance, it is not possible with these debuggers to single step more than one thread at a time. The single step feature is an important capability for an attacker because breakpoints cannot be set in certain tamper-resistant code (described further below) by means of code modification, because disturbing the integrity of the code may be detected and cause the termination of processing.

Debugging concurrent programs is the subject of current research and sophisticated multi-threaded debuggers such as KDB (as described in Buhr, et al.) have been prototyped for the UNIX environment. However, these multi-threaded debuggers assume that the application software being debugged or examined is built in a special debug mode where the application links to a special threading library. The debugger architecture includes a "global" debugger and a "local" debugger that is linked to the application. The threading library linked into the application software assists in reporting events to the local debugger, which in turn communicates with the global debugger via an asynchronous channel as required. Such a debugger would be of very limited or no use in the present scenario because the application software (e.g., a content player application program) would not be publicly distributed as being linked with the required debug thread libraries. If it were, this would greatly weaken the security of the system, rather than strengthen it. Such an outcome would not be supported by the developer of the application software.

By capitalizing on the inherent parallel aspects of some cryptographic protocols, operating system thread scheduling, and weaknesses in current debuggers, embodiments of the present invention improve the security of application software by using multiple threads to securely compute intermediate results of a cryptographic protocol. If any one of the threads is delayed beyond a predetermined grace period (possibly due to breakpointing or single-stepping the delayed thread's code by a debugger), the cumulative result of all of the thread's processing will be incorrect. This incorrect value may be detected and processing of content by the application software may be terminated, thereby depriving the attacker of access to the content.

FIG. 1 is a block diagram of an architecture for defending software from debugger attacks by using multiple threads according to an embodiment of the present invention. In system 10, an application 12 may be used to access content 14 as long as one or more agents determine that the integrity of the application has not been compromised. In one embodiment, the application comprises a player application to access and render content for perception by a user. Content may comprise any data such as, but not limited to, audio data, video data, and/or image data in any format now known or hereafter developed. In one embodiment, application 12 comprises tamper-resistant software to secure secrets on a non-trusted computing platform and the one or more agents 18, 20, and 22 comprise integrity verification kernels (IVKs). In other embodiments, other protection protocols may be used, such as the Fait-Shamir Signature scheme, for example, and the agents may comprise components other than IVKs.

Tamper resistant software is software which has been made resistant to observation and modification. It can be trusted, within certain bounds, to operate as intended even in the presence of a malicious attack on it. Tamper resistant software is position independent and does not require relocation in memory. Therefore, tamper resistant software does not have to run in the same address space or processor in which it was created. In one embodiment, such software is generated by using a tamper resistant compiler (not shown). The tamper resistant compiler is a compiler that, when applied to a well prepared software module, replaces the plain-text source code compiler generated image with a new image that is obfuscated. This self-decrypting software will only execute properly if no part of the image has been altered from the time it was compiled by the tamper resistant compiler. The tamper resistant compiler is a software approach towards providing kernels of software with the ability to run in a "hidden" execution mode. Attempts to decipher what the software is actually doing, or modifications made to the software, will result in the complete failure of the kernels (i.e., it will not decrypt properly).

In one embodiment, one or more of the multiple agents 18, 20, and 22 may operate as Integrity Verification Kernels (IVKs). An IVK is software that verifies that the "fingerprint" of an in-memory program image (e.g., all or a portion of application 12) corresponds to the data within a supplied digital signature. This procedure authenticates the program image. It provides a robust mechanism for detecting changes made to executing software, where those changes might be caused by transmission errors or malicious attacks on the software. Any unauthorized change to the software results in a failure in the verification process. If the verification process fails, then other processing may be inhibited from executing. For example, if the integrity of the application is detected by the IVK to be compromised, then the player application may not properly obtain fingerprint data for use in generating a cryptographic key to decrypt and play the content. IVKs for tamper resistant software are constructed to perform self-checks of object code, bilateral authentication of partner modules, and checks on local and remote data to verify the integrity of a software module. The IVK is self-modifying, self-decrypting, and may be installation unique.

Two intra-process software modules desiring to communicate with each other in an authenticated manner can establish that the module one is calling is indeed the one it is expecting by verifying the digital signature of the called module using a predetermined "root" key. This process is called bilateral authentication. In embodiments of the present invention, each agent may be used to verify the integrity of all or a portion of the application program. Each agent may also be used to perform bilateral authentication between the application 12 and the agent loader 16, for example, by using the techniques disclosed in U.S. Pat. No. 6,105,137, entitled "Method and Apparatus for Integrity Verification, Authentication, and Secure Linkage of Software Modules", which is commonly assigned to the same entity as the present invention. Detailed methods for creating tamper resistant modules and providing integrity verification processing with IVKs and bilateral authentication are described in U.S. Pat. No. 5,892,899, entitled "Tamper Resistant Methods and Apparatus" and U.S. Pat. No. 6,205,550 entitled "Tamper Resistant Methods and Apparatus", both of which are commonly assigned to the same entity as the present invention. Techniques for verifying the integrity of a system with multiple components is detailed in the pending patent application entitled "System and method for verifying integrity of system with multiple components," Ser. No. 09/967,738, which is commonly assigned to the same entity as the present invention.

Agent loader 16 proxies the application's call to application program interfaces (APIs) of the multiple agents 18, 20, and 22. The agent loader insures that agents are loaded and individual agent processing threads are started. In one embodiment, each thread contains one agent. Any number (N) of threads (thread 1, thread 2, . . . thread N) and accompanying agents (agent 1 18, agent 2 20, . . . agent N 22) may be used. In one embodiment, the agent loader is not tamper-resistant software. The agents 1–N may comprise computationally equivalent, uniquely tamper resistant software components using techniques based at least in part on the teachings of U.S. Pat. Nos. 5,892,899, 6,105,137, and 6,205,550. Each agent may be assigned a unique unit of work to perform as part of a concurrent cryptographic protocol used by the application in securely accessing content. Each thread may include a unique computationally equivalent version of an agent, and each agent may share access to an encrypted secure storage module 24. The secure storage comprises an encrypted memory that may be copied, decrypted, updated, re-encrypted, and replaced during execution of an agent.

Figure 2:
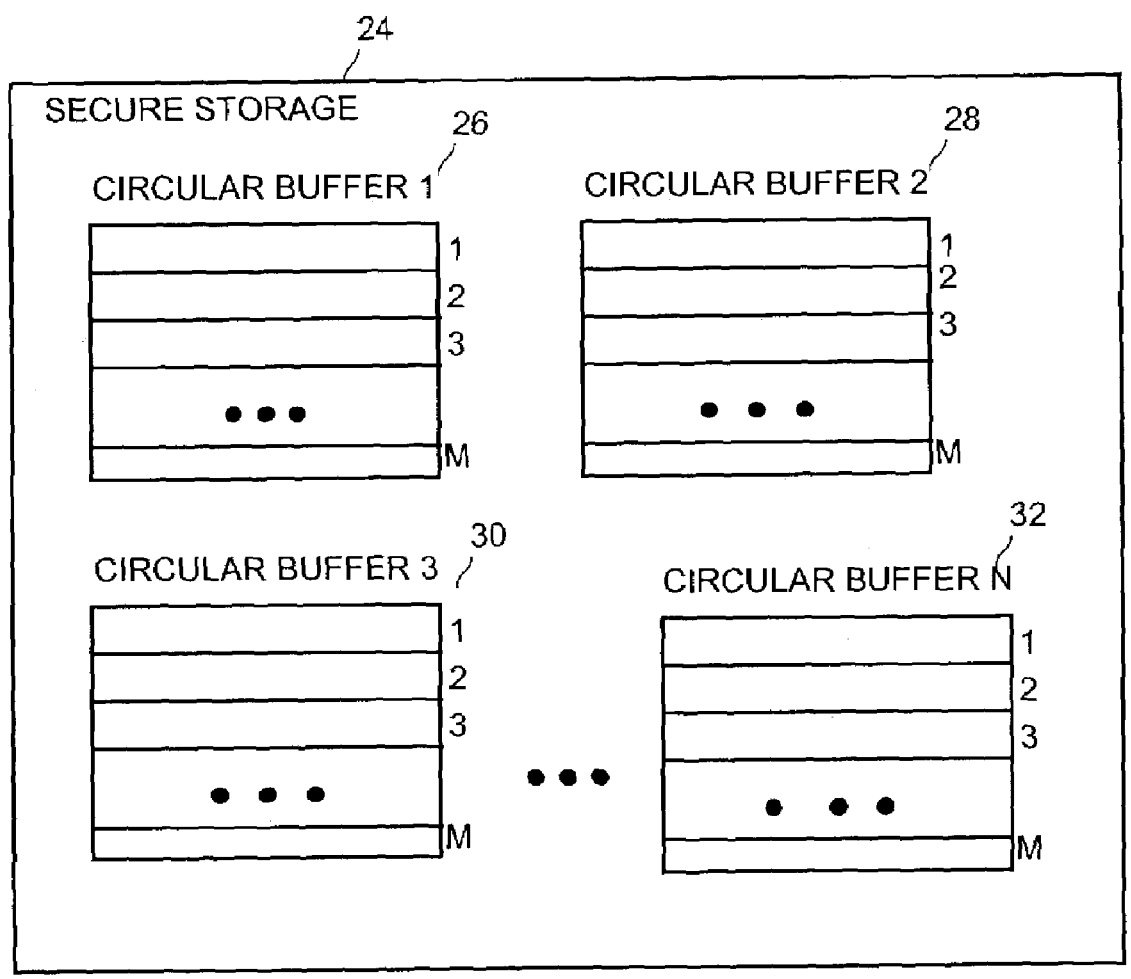
FIG. 2 is a diagram illustrating a secure storage including multiple buffers according to an embodiment of the present invention.

FIG. 2 is a diagram illustrating a secure storage including multiple buffers according to an embodiment of the present invention. In one embodiment, secure storage 24 includes a plurality of buffers 26, 28, 30, and 32, each buffer corresponding to one of the agents. In one embodiment, there may be N buffers. In one embodiment, each buffer comprises a circular buffer, although other data structures may also be used. The specific size and content of each buffer depends on the particular protocol or cryptographic method used by the application and agents. Each buffer may include a plurality of slots. In one embodiment, there may be M slots per buffer, with M being any positive integer. In one embodiment, M may be set by a system designer to ensure that agents work properly yet detect debugger attacks. The slots may be used to store individual results of a given unit of work done by an agent in a stage of a protocol. A grace period may be defined as the amount of time equal to M times the time to complete a unit of work by an agent. If a thread is delayed by a time greater than or equal to the grace period, an attack by a debugger may be detected. The secure storage may be protected by known cryptographic techniques.

Figure 3:
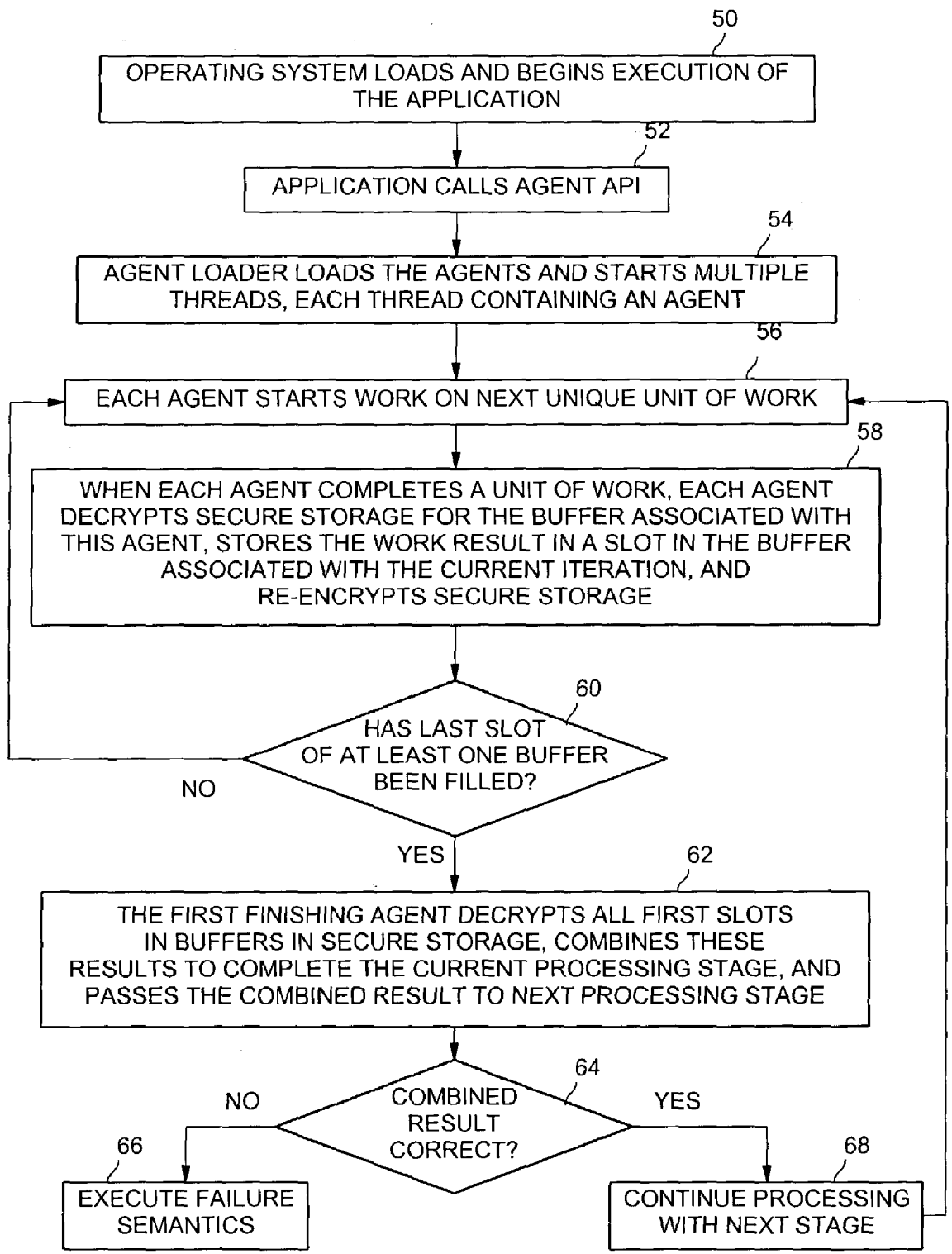
FIG. 3 is a flow diagram illustrating defending software from debugger attacks using by multiple agent threads according to an embodiment of the present invention.

FIG. 3 is a flow diagram illustrating defending software from debugger attacks by using multiple threads according to an embodiment of the present invention. At block 50, the operating system (not shown in FIG. 1) loads and begins execution of the application program 12. In one embodiment, the application program is a player application for accessing and rendering content and an attacker may desire to attack the player application using a debugger in order to gain unauthorized access to the content or to cryptographic keys used to decrypt the content. At block 52, the application calls an agent API to begin the first stage of the protocol in order to obtain properly authorized access to the content 14 of FIG. 1. Agent loader 16 then loads the multiple agents and starts multiple processing threads. In one embodiment, each thread contains a unique, computationally equivalent agent concurrently executing substantially in parallel with other agents. At block 56, each of the N agents starts work on a unique unit of work. At the first iteration, the unit of work is the first unit for this agent. In one embodiment, the unit of work may be computing an interim value as part of a cryptographic protocol. In one embodiment, each one of a plurality of agents from 1 to N starts work at block 56 on an associated portion of the cryptographic protocol processing at substantially the same time and in parallel. At block 58, when each agent completes a unit of computational work for the current iteration of the protocol processing, each agent decrypts the secure storage locations for the circular buffer associated with the agent, stores the work result in a selected slot in the buffer appropriate for the current iteration of the protocol processing, and re-encrypts the secure storage locations for the agent's circular buffer. As a result of the first iteration, each agent stores the agent's processing result in the first slot of each agent's buffer. As a result of subsequent iterations, each agent stores the subsequent processing result in a subsequent slot of each agent's buffer. In this way, as agents perform the work for subsequent iterations, the agents fill up, in order, the slots of the circular buffers until one of the agents fills the last slot M of a buffer.

In one embodiment, at block 60, if the last slot M of a circular buffer for an agent has been filled, then processing continues with block 62. Otherwise, processing continues with the next unit of work for this agent and the next iteration at block 56. In this way, all agents are performing work and filling slots in their buffers substantially in parallel. In one embodiment, a predetermined grace period may be approximately the number of slots in each buffer (e.g., M) times at least the estimated amount of time for an agent to perform each unit of work. If any agent does not produce at least the processing result for the first iteration by the end of the specified grace period (i.e., by the time the first finishing agent has produced the result for slot M), it may be assumed that that agent has been halted by a debugger as part of an attack on the application. At block 62, the first agent to complete all units of work assigned to it ("the first finishing agent") decrypts all of the first slots of the buffers 26, 28, 30, 32 in the secure storage, combines the results from the first slots to complete the current processing stage, and passes the results to a next processing stage in the cryptographic protocol. Data in other slots may be discarded or ignored.

In one embodiment of the present invention, blocks 56 through 60 may be executed for each of the agents 1 through N substantially in parallel. Thus, the agents are working on parts of the cryptographic protocol concurrently and substantially in parallel. Note that any one or more of the agents may pass the combined result determined from the first slots of the buffers to the next processing stage.

Processing of the next protocol stage may begin with block 64. If the combined result obtained by the first finishing agent is determined to be correct, then processing may continue with further work on the next stage at block 68. How the combined result is determined be correct depends on the specific protocol used. In the case of IVKs, the combined result may be a hash that is compared with an expected value that was pre-computed when the application being verified was originally signed. This pre-computed value may have been obtained in a previous stage of the protocol and stored in secure storage. In this case, the first finishing agent would detect the error and execute failure semantics designed to deny access to the content. In another embodiment of the current invention, the agent thread pool may be used to implement a signature verification scheme, such as Fait-Shamir. In this case, the finishing agent passes the combined result over a secure authenticated channel to an external process on the current computer or to another computer on the Internet, for example. In this case, the external process detects that the signature is not valid and denies access to the content by terminating the protocol.

The next stage may comprise a call to another agent API (e.g., another thread pool), or it could be a call to a process external to the application, such as communicating over a secure authenticated channel to another component in the system. When the combined result of the processing by the multiple agents for the first slot is correct, in one embodiment, processing may continue at block 56 with the next stage of the protocol. When the combined result of the processing by the multiple agents is incorrect, one or more of the threads may have been stopped or delayed by an attacker's debugger, causing one or more of the agents in those threads to fail to complete and store their work results in the first slot of the associated buffer within the predetermined grace period. In this case, an indication of an attack has occurred and failure semantics or processing may be performed at block 66. In one embodiment, executing the failure semantics may comprise terminating execution of the application program.

Embodiments of the present invention provide a new method of defense that takes advantage of fair scheduling of threads, coupled with parallel properties of cryptographic algorithms and the limitations of known debuggers when controlling multi-threaded applications. Embodiments of the present invention increase the complexity and strength of a tamper-resistant software solution by using multiple, unique agent threads. When an attacker attempts to analyze the application with a debugger, the present invention detects the attack and terminates the application, thereby denying the attacker the ability to understand how to extract secrets from the application.

In known current systems, agents are typically single threaded. If the debug defenses can be removed, then an attacker may use a debugger to single step through the application and analyze and extract secrets. With the present invention, secrets and cryptographic protocol processing may be distributed in parallel to many unique agents, each of which represents a unique challenge for the attacker to understand and attack. Further, the use of a debugger by the attacker to help in this analysis will upset the temporal balance of the threads, causing the grace period to expire and the protocol to fail. Because current agents are single threaded, it may be possible for an attacker to "get lucky" when setting a breakpoint in a module on which cross integrity verification is being done. With the present invention, multiple thread verification is used, and the attacker cannot "get lucky" with the breakpoint because the verification will be on a different thread. With the present invention, since many unique agents may be used, the complexity presented to a potential attacker is increased. This significantly strengthens the security of the tamper-resistant software solution.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of deterring an attack on a tamper-resistant application program comprising:

beginning execution of the tamper-resistant application program;

loading a plurality of agents and starting a plurality of processing threads, each thread executing one of the agents;

concurrently executing each agent substantially in parallel to produce a processing result for each agent for an iteration of a stage of protocol processing;

storing each processing result in an entry in a buffer associated with each agent;

repeating the executing and storing actions for multiple iterations of the protocol processing;

when one of the agents stores a processing result in a last entry of the agent's buffer, combining processing results from the first entries of the buffers to produce a combined result; and if the combined result indicates an error, executing failure semantics.

2. The method of claim 1, wherein executing failure semantics comprises terminating execution of the tamper-resistant application program.

3. The method of claim 1, further comprising:

if the combined result does not indicate an error, continuing processing of a next stage of protocol processing.

4. The method of claim 1, wherein the protocol comprises a cryptographic protocol.

5. The method of claim 1, wherein each agent operates as an integrity verification kernel continuously verifying the integrity of the tamper-resistant application program.

6. The method of claim 1, wherein the tamper-resistant application program comprises a player application to access protected content.

7. The method of claim 1, wherein the buffer comprises a circular buffer stored in encrypted form in a secure storage.

8. The method of claim 7, wherein storing each processing result comprises decrypting the entry, storing the processing result, and re-encrypting the entry.

9. An article comprising: a tangible storage medium having a plurality of machine accessible instructions, wherein when the instructions are executed by a processor, the processor provides for deterring an attack on a tamper-resistant application program by beginning execution of the tamper-resistant application program;

loading a plurality of agents and starting a plurality of processing threads, each thread executing one of the agents;

concurrently executing each agent substantially in parallel to produce a processing result for each agent for an iteration of a stage of protocol processing;

storing each processing result in an entry in a buffer associated with each agent;

repeating the executing and storing actions for multiple iterations of the protocol processing;

when one of the agents stores a processing result in a last entry of the agent's buffer, combining processing results from the first entries in the buffers to produce a combined result; and if the combined result indicates an error, executing failure semantics.

10. The article of claim 9, wherein instructions for executing failure semantics comprise instructions for terminating execution of the tamper-resistant application program.

11. The article of claim 9, further comprising instructions for if the combined result does not indicate an error, continuing processing of a next stage of protocol processing.

12. The article of claim 9, wherein the protocol comprises a cryptographic protocol.

13. The article of claim 9, wherein each agent comprises instructions for operating as an integrity verification kernel continuously verifying the integrity of the tamper-resistant application program.

14. The article of claim 9, wherein the tamper-resistant application program comprises a player application to access protected content.

15. The article of claim 9, wherein the buffer comprises a circular buffer stored in encrypted form in a secure storage.

16. The article of claim 15, wherein instructions for storing each processing result comprise instructions for decrypting the entry, storing the processing result, and re-encrypting the entry.

* * * * *